3,424,543
PROCESS FOR DYEING OR PRINTING POLYHYDROXYLATED MATERIALS
Peter Stahel and Jacques Wegmann, Basel, and Bernhard Ruetimeyer, Neu-Allschwil, Switzerland, assignors to Ciba Limited, Basel, Switzerland
No Drawing. Filed Aug. 5, 1957, Ser. No. 676,393
Claims priority, application Switzerland, Aug. 14, 1956, 36,517/56
U.S. Cl. 8—54.2                   10 Claims
Int. Cl. D06p 3/66

ABSTRACT OF THE DISCLOSURE

Cellulosic textile material is impregnated on a foulard or by direct dyeing from a long liquor with a dyestuff which contains at least one water-solubilizing group and at least one —$SO_2NHC_2H_4Cl$ or —$SO_2NHC_2H_4Br$ group, and then the thus-treated textile material is subjected to heat treatment in the presence of an acid-binding agent to fix the dyestuff on the material. A wide variety of dyestuffs can be used, especially good results being obtained with soluble dyes which normally possess little or no affinity for cotton.

---

This invention provides a process for dyeing or printing polyhydroxylated materials such as cellulose-containing materials or fibrous structure by a printing or foularding method or by the direct-dyeing method from a long liquor. In the process of this invention fast dyeings or prints are obtained by using an organic dyestuff which contains at least one and preferably more than one acid group imparting solubility in water and at least one substituent which is bound to a carbon atom of the aliphatic chain of a sulfonic acid alkylamide residue present in the dyestuff molecule and is capable of being easily split off with the taking over of the electron pair of the bond, and the dyestuff is fixed on the material by a heat treatment in the presence of an inorganic acid-bonding agent, which is advantageously at least as alkaline as sodium carbonate.

As labile substituents, which are capable of being split off with the taking over of the electron pair of the bond, there may be mentioned, for example, aliphatically bound phosphoric or sulfuric acid ester groups and especially aliphatically bound sulfonyloxy groups and halogen atoms, especially an aliphatically bound chlorine atom. The labile substituent is advantageously bound in the γ- or β-position of the aliphatic residue which is bound to the dyestuff molecule through a sulfonic acid amide group.

In addition to at least one substituent of the above kind, the dyestuffs used in the process of this invention contain at least one acid, and advantageously strongly acid group, imparting solubility in water, such as an acylated sulfonic acid amide group, a carboxyl group or more especially a sulfonic acid group. It is of advantage to use a dyestuff which contains more than one such acid group.

As soluble organic dyestuffs there may be used those of a wide variety of classes, for example, stilbene dyestuffs, azine dyestuffs, dioxazine dyestuffs, anthraquinone dyestuffs, and above all acid phthalocyanine dyestuffs and especially acid azo-dyestuffs, including metal-free and metalliferous monoazo- and polyazo-dyestuffs. Especially good results are obtained with soluble dyestuffs which possess little or no affinity for cotton.

A large number of dyestuffs of the aforesaid kind are known or can be made by methods in themselves known, for example, from dyestuff components which themselves contain a labile substituent of the kind defined above, or by introducing such labile substituent or a radical containing such labile substituent into the dyestuff molecule by a method in itself known after manufacture of the dyestuff. Thus, dyestuffs suitable for the process of this invention are obtained by reacting an azo-dyestuff sulfonic acid halide or phthalocyanine sulfonic acid halide or anthraquinone dyestuff sulfonic acid halide with, for example, β-chlorethylamine, if desired, after hydrolysing to free the sulfonic acid groups any unreacted sulfonic acid halide groups. The group of dyestuffs which contain an aliphatically bound sulfonyloxy group can be made, for example, by reacting one molecular proportion of a dyestuff containing a sulfonic acid-N-oxyalkylamide group with at least one molecular proportion of an organic sulfonic acid halide, for example, tosyl chloride, benzene sulfonyl chloride or ethane sulfonyl chloride, in such manner that the hydroxyl group is acylated.

Cellulose-containing materials of fibrous structure, either synthetic fibers, for example, of regenerated cellulose or viscose, or natural materials, for example, linen or more especially cotton may be impregnated with a dyestuff of the kind used in this invention on a foulard or by the direct dyeing method from a long liquor. It is of advantage to use aqueous solutions of the dyestuffs in question. With such solutions, which may contain more or less neutral, and preferably inorganic, salts such as alkali metal chlorides or sulfates, and if desired also, preferably inorganic, acid-binding agents such as alkali metal carbonates, alkali metal phosphates, alkali metal borates or perborates or mixtures of these salts, especially buffer mixtures thereof, the material is dyed or impregnated advantageously in the cold or at a moderately raised temperature or, in the absence of an alkali, at a hot temperature, for example, of 60–80° C., and the material is then squeezed in the usual manner, and advantageously to such an extent that the impregnated material retains 0.5 to 1.3 parts of its weight of dyestuff solution.

Fixation of the dyestuff on the material thus impregnated with the dyestuff solution is brought about after the impregnation. For this purpose, for example, the impregnated material, if desired, after being dried and, if the impregnating solution contained no inorganic acid-binding agent, after treating the material with an aqueous alkaline solution of an inorganic acid-binding agent, for example, a salt-containing solution of an alkali metal hydroxide, at a raised temperature or in the cold, is heated for a short time with steam or, for example, in a hot air current or on a heated cylinder. By using impregnating baths which contain substantially neutral substances that do not yield alkali the material may, if desired, be allowed to stand for a long period prior to the fixation treatment, and this may be an important advantage if the lay-out of the apparatus used makes it desirable to do so. Instead of carrying out the fixation with the aid of a separate alkaline bath, the inorganic alkali or agent yielding alkali, such as sodium bicarbonate may be added to the impregnation bath from the outset, and the impregnated material subjected directly to steaming or other heat treatment, without the interposition of an alkaline bath and without intermediate drying of the material.

Fixation of the dyestuff may also be carried out during the dyeing process. For this purpose there is added to the dyebath an acid-binding agent of such nature and in such quantity that a distinctly alkaline reaction is imparted to the bath. Thus, the acid-binding agent may be added to the dyebath together with the dyestuff, and care is taken, for example, by using a buffer mixture, for example, of disodium phosphate and trisodium phosphate, that the bath has a pH value exceeding 10, and advantageously of about 12.5. It is possible to work at lower pH values with higher temperatures, for example, by dyeing in the warm. It is generally of advantage to conduct the dyeing process in the warm.

In order to exhaust the dyebath it is of advantage to add a salt together with the dyestuff or during the dyeing process, if desired, in portions. During the dyeing process the dyestuff containing the aforesaid labile substituent reacts with the cellulose-containing material to be dyed, whereby the material probably fixes the dyestuff due to chemical combination. In order to enhance the fixing process the dyebath, if it did not contain acid-binding agent from the outset, may be rendered distinctly alkaline by the addition of an alkali, for example, sodium carbonate, potassium carbonate or a caustic alkali solution. The pH value of an initially weakly acid to neutral or weakly alkaline dyebath may be gradually increased during the entire dyeing process or, after applying the dyestuff to the material to be dyed, the material may be treated, if desired, after being dried, in a fresh alkaline bath in order to fix the dyestuff. It is usually of advantage, however, to add the acid-binding agent to the dyebath from the outset.

Instead of preparing the dyebath or the solution used for impregnation by dissolving the dyestuff, and if desired, a more or less neutral, inorganic salt simultaneously or in succession in water, the dyestuff and the salt may be made up into a paste-like or preferably dry preparation. There may be incorporated with the preparation to be used for preparing the impregnation solution, in addition to or instead of the salt a non-electrolyte such as urea and, if desired, a buffer salt or an agent capable of yielding alkali, for example, when heated.

Instead of applying the dyestuff to the material by impregnation or by direct dyeing from a long liquor, it may be applied in the process of this invention by printing. For this purpose there is used, for example, a printing color which contains, in addition to auxiliary agents customary in printing, for example, wetting and thickening agents, at least one dyestuff of the kind defined above and, if desired, an inorganic acid-binding agent or a substance capable of yielding such an agent.

As auxiliary agents for preparing printing pastes there may be mentioned, for example, urea and thickening agents, such as alkyl-celluloses, for example, methyl-cellulose, or alginates.

As inorganic acid-binding agents and as substances capable of yielding such agents there are to be understood preferably those which are of at least as alkaline a reaction as sodium carbonate, for example, alkali metal salts such as potassium cyanide, sodium carbonate or sodium bicarbonate, potassium carbonate, trisodium phosphate or a mixture of disodium and trisodium phosphate, and also alkali metal or alkaline earth metal hydroxides, especially sodium hydroxide or mixtures of alkali metal hydroxides with potassium carbonate. When a printing color is used which does not contain an acid-binding agent, the printed material is subjected to an alkaline treatment, advantageously in a concentrated salt-containing alkali metal carbonate solution or advantageously in a concentrated salt-containing alkali metal or alkaline earth metal hydroxide solution, and subsequently to the action of heat, if desired, in the presence of water vapor. If the printing color contains an inorganic acid-binding agent or an inorganic substance which, for example, when heated becomes as alkaline as sodium carbonate, an alkaline treatment of the printed material prior to heating or steaming is not necessary.

By the process of this invention very valuable, strong, and generally very full dyeings or prints having excellent properties of wet fastness and of very good fastness to light are produced on polyhydroxylated, and especially cellulose-containing, materials of fibrous structure even with the use of dyestuffs within the foregoing definition which have little or no affinity for cotton.

In certain cases it may be of advantage to subject the dyeings or prints produced by the process to an after-treatment. Thus, for example, the dyeings are advantageously soaped at the boiling temperature whereby any dyestuff which remains unfixed is removed. When the dyestuff used for dyeing or printing in the process of this invention contains metallisable groups the dyeing or print made with such dyestuff may be after-treated with an agent yielding a heavy metal, and especially an agent yielding copper.

The following examples illustrate the invention, the parts and percentages being by weight, and although the dyestuffs are given in the form of their free acids, they are used in the form of alkali metal salts thereof.

EXAMPLE 1

2 parts of the dyestuff which, in the form of the free acid, has the formula

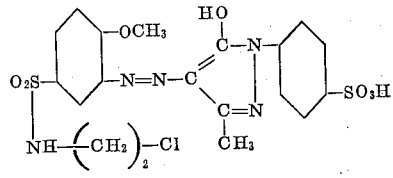

are dissolved in 2000 parts of water. In the resulting dyebath there are entered at 20–25° C. 100 parts of well wetted cotton yarn. In the course of 30 minutes there are added in portions 500 parts of sodium chloride solution of 20% strength. After a further 10 minutes there are added 30 parts of a sodium hydroxide solution of 15% strength, the solution is heated to 85–90° C. and dyeing is carried on for a further 60 minutes at 85–90° C. After rinsing the yarn in cold water it is soaped for 15 minutes at 85–100° C. and then thoroughly rinsed in cold water and dried. There is obtained a yellow dyeing which is fast to washing.

A similar result is obtained by using a corresponding quantity of calcium hydroxide, instead of sodium hydroxide, or by using, instead of the above mentioned dyestuff, 2 parts of the dyestuff of the formula

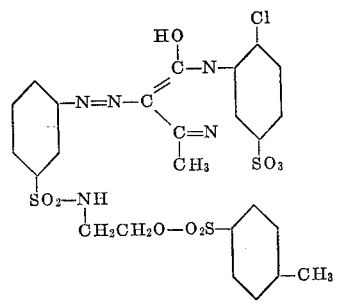

EXAMPLE 2

1 part of the dyestuff of the formula

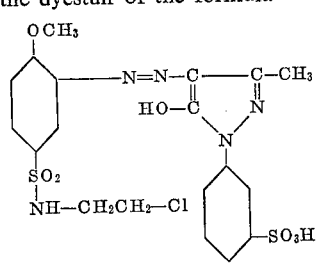

is dissolved in 100 parts of water and the solution is applied to a fabric of staple fibers of regenerated cellulose at 40° C. on a foulard. The excess liquor is squeezed from the fabric until it retains 75% of its weight of dyestuff solution.

The material so impregnated is dried and then impregnated at room temperature in a solution which contains, per liter, 10 grams of sodium hydroxide and 300 grams of sodium chloride, and the material is then squeezed until it retains 75% of its weight of liquor and is steamed for 60 seconds at 100–101° C. It is then rinsed, treated in sodium bicarbonate solution of 0.5% strength, rinsed, soaped for ¼ hour in a solution of 0.3% strength of a non-ionic detergent at the boiling temperature, rinsed and dried.

There is produced a powerful reddish yellow dyeing of excellent fastness to washing.

By using, instead of the above mentioned dyestuff, 1 part of the dyestuff of the formula

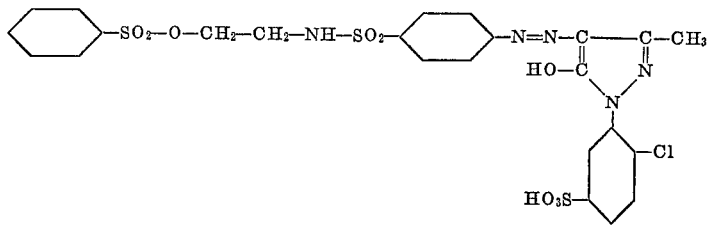

or 1 part of the dyestuff of the formula

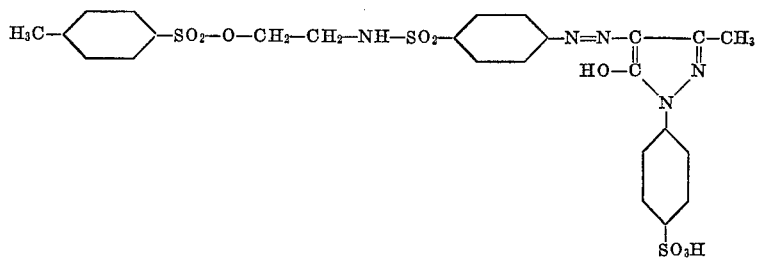

and otherwise proceeding in the manner described above, there are obtained yellow dyeings having similar good properties of wet fastness.

EXAMPLE 3

2 parts of the dyestuff of the formula

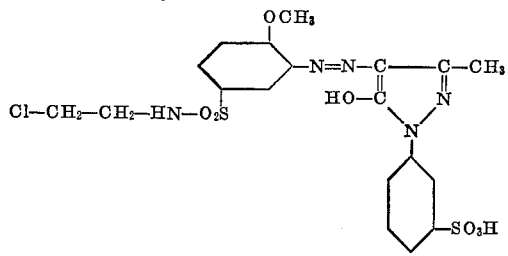

are dissolved in 400 parts of water at 50° C. and the solution is diluted to 4000 parts with cold water. There are added 80 parts of trisodium phosphate and 80 parts of sodium chloride, and 100 parts of a cotton fabric are entered into the dyebath so prepared and the temperature is raised in the course of ½ hour to 60° C., 80 parts of sodium chloride are added, and the temperature is raised in the course of 15 minutes to 80° C. and the dyebath maintained for a further 30 minutes at that temperature. The dyeing is then rinsed and soaped for 15 minutes in a solution of 0.3% strength of a non-ionic detergent at the boiling temperature. The material is rinsed and dried, and there is obtained a yellow dyeing of very good fastness to washing.

By using, instead of 80 parts of trisodium phosphate 2 parts of sodium hydroxide and otherwise proceeding in the same manner, a similarly good yellow dyeing is produced.

EXAMPLE 4

1 part of the dyestuff of the formula

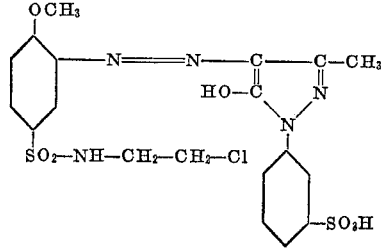

is dissolved by means of 5 parts of urea mixed with 34 parts of warm water, and the solution is stirred into 60 parts of carob bean flour thickening of 3% strength.

A fabric of staple fibers of regenerated cellulose is printed with the above printing color on a roller printing machine and dried.

The fabric is then passed in an extended condition at room temperature through a solution containing, per liter, 10 grams of sodium hydroxide and 300 grams of sodium chloride, and the excess solution is squeezed off until the increase in weight of the fabric is 75%.

The fabric is then steamed for 60 seconds, rinsed, treated with an aqueous solution of 5 grams of sodium bicarbonate per liter, again rinsed, and soaped for 15 minutes at the boiling temperature in a solution of 0.3% strength of a non-ionic detergent. The fabric is then rinsed and dried, and there is obtained a strong yellow print fixed fast to boiling.

EXAMPLE 5

3 parts of the dyestuff of the formula

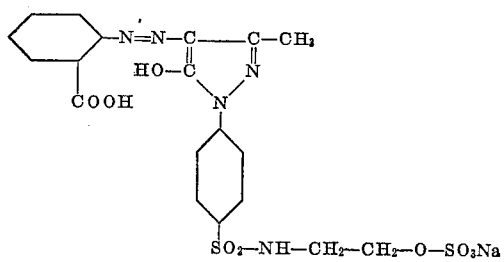

are dissolved in 100 parts of water. A cotton fabric is impregnated with the solution at 20° C., and then squeezed to an increase in weight of 75% and dried. The fabric is then passed through a solution, having a temperature of 20° C., of 10 parts of sodium hydroxide and 300 parts of sodium chloride in 1000 parts of water, and the fabric is squeezed to a weight increase of 75% and steamed for 60 seconds. It is then rinsed and soaped for 15 minutes at the boiling temperature in a solution of 0.1% strength of a non-ionic detergent. A strong yellow dyeing is obtained which is fast to boiling.

If the material, after being passed through the bath rendered alkaline with caustic soda, is dried, subjected to a temperature of 140° C. for 5 minutes, rinsed, and soaped in the manner described above, a similar good result is obtained.

By using, instead of the aforesaid dyestuff, the same quantity of the dyestuff of the formula

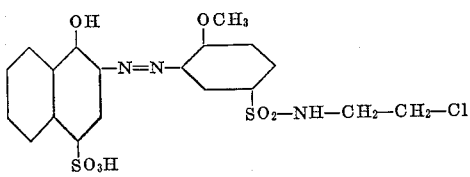

and otherwise proceeding in the manner described above, there is obtained a red dyeing having similarly excellent properties of wet fastness.

EXAMPLE 6

3 parts of the dyestuff mentioned in the first paragraph of Example 5 are mixed with 7 parts of urea in 40 parts of water. The solution is added, while stirring, to 50 parts of a thickening consisting of 50 parts of sodium alginate in 950 parts of water.

A fabric of staple fibers of regenerated cellulose is printed with the resulting printing color and then dried. The print is passed through a cold solution of 10 parts of sodium hydroxide and 300 parts of sodium chloride in 1000 parts of water, the excess solution is squeezed off, and the fabric is steamed for 60 seconds, rinsed and soaped. There is obtained a clear yellow print fixed fast to boiling.

EXAMPLE 7

5 parts of copper phthalocyanine sulfonic acid-N-β-chlorethylamide trisulfonic acid are dissolved in 400 parts of water at 50° C. and the whole is diluted with cold water to 4000 parts. There are added 40 parts of trisodium phosphate and 80 parts of sodium chloride, 100 parts of a cotton fabric are entered into the dyebath so prepared, and the temperature is raised to 60° C. in the course of ½ hour, 80 parts of sodium chloride are added, and the temperature is raised in the course of 15 minutes to 80° C. and maintained for a further 30 minutes. The dyeing is then rinsed and soaped for 15 minutes in a solution of 0.3% strength of a non-ionic detergent at the boiling temperature. The fabric is rinsed and dried, and there is obtained a turquoise blue dyeing of very good fastness to washing.

The copper phthalocyanine sulfonic acid-chlorethylamide trisulfonic acid used above can be prepared, for example, as follows:

0.025 mol of copper phthalocyanine sulfochloride (a mixture of the trisulfochloride-monosulfonic acid and the disulfochloride-disulfonic acid), obtained by heating copper phthalocyanine with chlorosulfonic acid at 130° C., is poured on to ice and sodium chloride and isolated by filtration.

The sulfochloride so obtained is stirred as an acid paste with 25 parts of water and 25 parts of ice until it is very finely dispersed, and the mixture is adjusted to a pH value of 7 to 7.3 by adding a dilute solution of sodium hydroxide at 0–3° C. To the resulting neutralized sulfochloride suspension there is added an aqueous solution of 0.025 mol of β-chlorethylamine, prepared by dissolving 2.9 parts of β-chlorethylamine hydrochloride in 125 parts of water with the addition of 25 parts by volume of a 1 N solution of sodium hydroxide. The reaction mixture is stirred for 24 hours at 20–22° C. while scattering 3–4 parts of calcined sodium carbonate in portions on to the mixture so that the pH value does not fall below 7.2. The whole is diluted with 350–400 parts of water and heated to 45–50° C. By the addition of a dilute solution of sodium hydroxide the pH value is maintained between 7 and 8. The pH value remains constant for one hour at about 40° C. without the further addition of alkali, and then, if desired, traces of undissolved dyestuff are removed by filtration, and the dyestuff is precipitated under neutral conditions by salting out with sodium chloride and is dried in vacuo at 50° C.

EXAMPLE 8

30 parts of the dyestuff used in Example 7 are dissolved with 150 parts of urea in 339 parts of water. There are added to the resulting solution, while stirring, 450 parts of a thickening prepared from 40 parts of sodium alginate and 960 parts of water, 30 parts of potassium carbonate and 1 part of sodium hydroxide solution of 36° Bé.

A cotton fabric is printed with the printing color so obtained, and steamed for 5 minutes at 100° C., after being dried, and the fabric is then rinsed with cold water and subsequently hot water, soaped at the boil, again rinsed, and dried.

A brilliant turquoise blue print is obtained in this manner.

EXAMPLE 9

5 parts of the dyestuff used in Example 7 are dissolved in 100 parts of water. With the resulting solution at 20° C. a cotton fabric is impregnated, then squeezed to an increase in weight of 75% and dried. The fabric is then passed through a solution having a temperature of 20° C., of 10 parts of sodium hydroxide and 300 parts of sodium chloride in 1000 parts of water, then squeezed to an increase in weight of 75%, and steamed for 60 seconds. The fabric is then rinsed and soaped for 15 minutes at the boiling temperature in a solution of 0.1% strength of a non-ionic detergent. There is obtained a strong turquoise blue dyeing which is fast to boiling.

By using, instead of a cotton fabric, a fabric of viscose artificial silk, suprammonium artificial silk, linen or ramie, there is likewise obtained a fast blue dyeing. A good result is likewise obtained by using potassium hydroxide or lithium hydroxide instead of sodium hydroxide.

What is claimed is:

1. A process for coloring polyhydroxylated cellulosic materials of fibrous structure, wherein an organic dyestuff which contains at least one water-solubilizing group and a member selected from the group consisting of a halogen atom, a sulfonyloxy group and a sulfuric acid ester group bound to a carbon atom of the aliphatic chain of an N-alkyl-sulfonamide group is fixed on the polyhydroxylated cellulosic material by heating in the presence of an acid binding agent.

2. A process for coloring cellulosic materials of fibrous structure wherein a water-soluble monoazo dyestuff containing an N-alkyl sulfonamide group having a chlorine atom in β-position of the alkyl group is padded on the cellulosic material and then steamed in the presence of alkali.

3. A process for coloring cellulosic materials of fibrous structure wherein a water-soluble monoazo dyestuff containing an N-ethyl sulfonamide group bearing a sulfonyloxy group in β-position of the ethyl group is padded on the cellulosic material and then steamed in the presence of alkali.

4. A process for coloring cotton, wherein the cotton is padded with an aqueous solution of a water-soluble monoazo dyestuff containing a sulfonic acid group as water solubilizing group and a sulfo acid β-chlorethylamide group and then with an aqueous saline solution of an alkali metal hydroxide and the thus-padded cotton is steamed.

5. The process of claim 4 wherein the monoazo dyestuff used corresponds to the formula

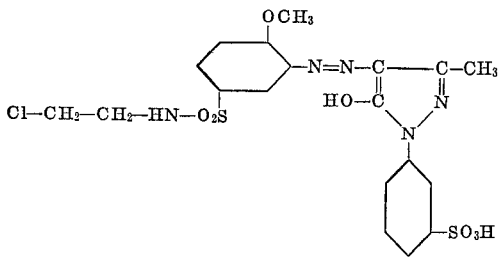

6. The process of claim 4 wherein the monoazo dyestuff used corresponds to the formula

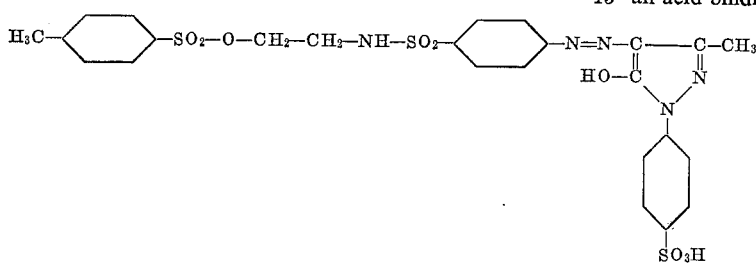

7. Process for the coloration of a cellulosic textile material which comprises applying to these materials dyestuffs containing at least one water solubilizing group and at least one group of the formula

—SO$_2$NHC$_2$H$_4$X where X is taken from the group consisting of bromine and chlorine and then heating said treated material in the presence of an acid-binding agent.

8. Process for the coloration of a cellulosic textile material which comprises applying to these materials dyestuffs containing at least one water solubilizing group and at least one group of the formula —SO$_2$NHC$_2$H$_4$—halogen and then heating said treated material in the presence of an acid-binding agent.

9. Process for the coloration of a cellulosic textile material which comprises applying to these materials dyestuffs containing at least one water solubilizing group and at least one group of the formula —SO$_2$NHC$_2$H$_4$Cl and then heating said treated material in the presence of an acid-binding agent.

10. Process for the coloration of a cellulose textile material which comprises applying to these materials azo dyestuffs containing at least one water solubilizing group and at least one group of the formula —SO$_2$NHC$_2$H$_4$Cl and then heating said treated material in the presence of an acid-binding agent.

References Cited

UNITED STATES PATENTS

| | | | |
|---|---|---|---|
| 2,731,476 | 1/1956 | Peter | 8—39 X |
| 2,670,265 | 2/1954 | Heyna | 8—62 X |
| 2,424,493 | 7/1947 | Muller | 260—163 |
| 2,766,231 | 10/1956 | Bolliger | 260—163 |
| 2,863,875 | 12/1958 | Bienart | 260—314.5 |
| 2,895,785 | 7/1959 | Alsberg | 8—54.2 X |

OTHER REFERENCES

Gilman: Organic Chemistry, John Wiley and Sons, New York, 2nd ed., vol. 1, 1943, pp. 880–881, 901.

NORMAN G. TORCHIN, *Primary Examiner.*

T. J. HERBERT, JR., *Assistant Examiner.*

U.S. Cl. X.R.

8—39, 41